UNITED STATES PATENT OFFICE.

CYRUS E. BRADLEY, OF DETROIT, MICHIGAN.

PROCESS OF ORNAMENTING GLASS.

SPECIFICATION forming part of Letters Patent No. 243,199, dated June 21, 1881.

Application filed January 31, 1881. (No specimens.)

*To all whom it may concern:*

Be it known that I, CYRUS E. BRADLEY, of Detroit, Wayne county, Michigan, have invented an improvement in Processes of Ornamenting Glass, of which the following is a specification.

The nature of this invention relates to new and useful improvements in the preparation of glass plates for etching, the preparing of the desired pattern on the same, and of finishing the glass; and the invention consists in the peculiar processes in successive steps, all as more fully hereinafter described.

The glass to be ornamented should be well cleaned to remove all grease and other extraneous or deleterious matter upon the side to be ornamented, and is then heated, preferably in a box steam-coil, with the cleaned side upward. Then take metallic foil, preferably largely composed of lead, lay said foil on the glass with the dull side uppermost, and coat the foil on its exposed side with pure melted beeswax. Then remove the foil. When the glass is hot enough to melt the wax, coat the glass with such wax and replace the foil with the wax side to the glass. Then place over the foil a piece of heavy paper or other analogous substance, and with a small metallic plate press sufficiently on the paper to squeeze out all the wax which can be thus removed from beneath the foil. Then take the glass out of the heater and allow it to cool, when it is to be well cleaned with turpentine and given a light coat of a mixture of lamp-black and turpentine. The glass is now ready to receive the pattern.

The pattern is drawn on suitable paper and the outlines pricked through with a needle, when it is laid on the foil, and with a pounce made of any suitable and white material, powdered, and tied up in a piece of cloth, the pounce is dusted on the pattern, the fine dust passing through the pricked holes, giving the outline of the pattern on the foil below. The paper drawing should then be carefully removed, so as not to disturb the pounce spots or marks, and the pattern is ready to be cut out of the foil with a suitable knife or chisel adapted to cut straight or curved lines. For small round holes in the pattern a circular punch is employed, or one of the shape desired, while true circles are cut with a compass with a knife in one leg. After the pattern is all cut and the pieces of foil picked out, lay a piece of heavy paper on top of the pattern, and with a metallic plate press it smoothly onto the glass. Then clean all of the wax from the face of the glass, where the foil has been removed, by means of turpentine and any suitable brush or cloth. Then stand the glass on edge and coat it with asphaltum mixed with a little beeswax, and melted together, on the rear side of the glass. Circumstances may require sometimes more than one coat of this preparation. When the preparation is dry the plate is ready for etching by acid. This acid is hydrofluoric, and, if of standard strength, should be diluted with water about in the proportion of one part water and two parts acid. This acid is contained in a vat or tank preferably made of wood, and it should be lined with heavy sheet-lead. The glass is then immersed in the acid, and allowed to remain until it is etched or cut deep enough to be ground with emery. Before grinding, the plate is removed from the vat and washed with clean water, and replaced in the heater. When hot the foil pattern should be removed and the plate cleaned with turpentine or other suitable material for the purpose. The plate is then ready for grinding, which is done, in the usual manner, with emery and water.

What I claim as my invention is—

1. The process herein described of preparing a plate of glass to receive the pattern to be etched, consisting in securing to the plate a sheet of metal foil, as set forth.

2. The process herein described for preparing a plate of glass to receive the pattern to be etched, consisting in coating a sheet of foil with wax and then securing it to the plate of glass by the application of heat, substantially as set forth.

3. The process herein described of preparing a plate of glass to be etched, consisting in attaching to one of its sides a sheet of foil in which the pattern is cut and coating the other side with a protective varnish, as specified.

4. A process for etching a pattern or design upon a plate of glass, consisting in securing to one side of the glass a sheet of foil, transferring a pattern upon said foil, and cutting out portions of the foil to expose the surface of the glass to be etched, coating the other side of the glass with a protective varnish, and then submitting the plate so prepared to an acid-bath, substantially as described.

CYRUS E. BRADLEY.

Witnesses:
H. S. SPRAGUE,
EDMOND SCULLY.